May 8, 1923.
C. OWENS
GRAIN HARVESTER
Filed March 26, 1921
1,454,071
2 Sheets-Sheet 1
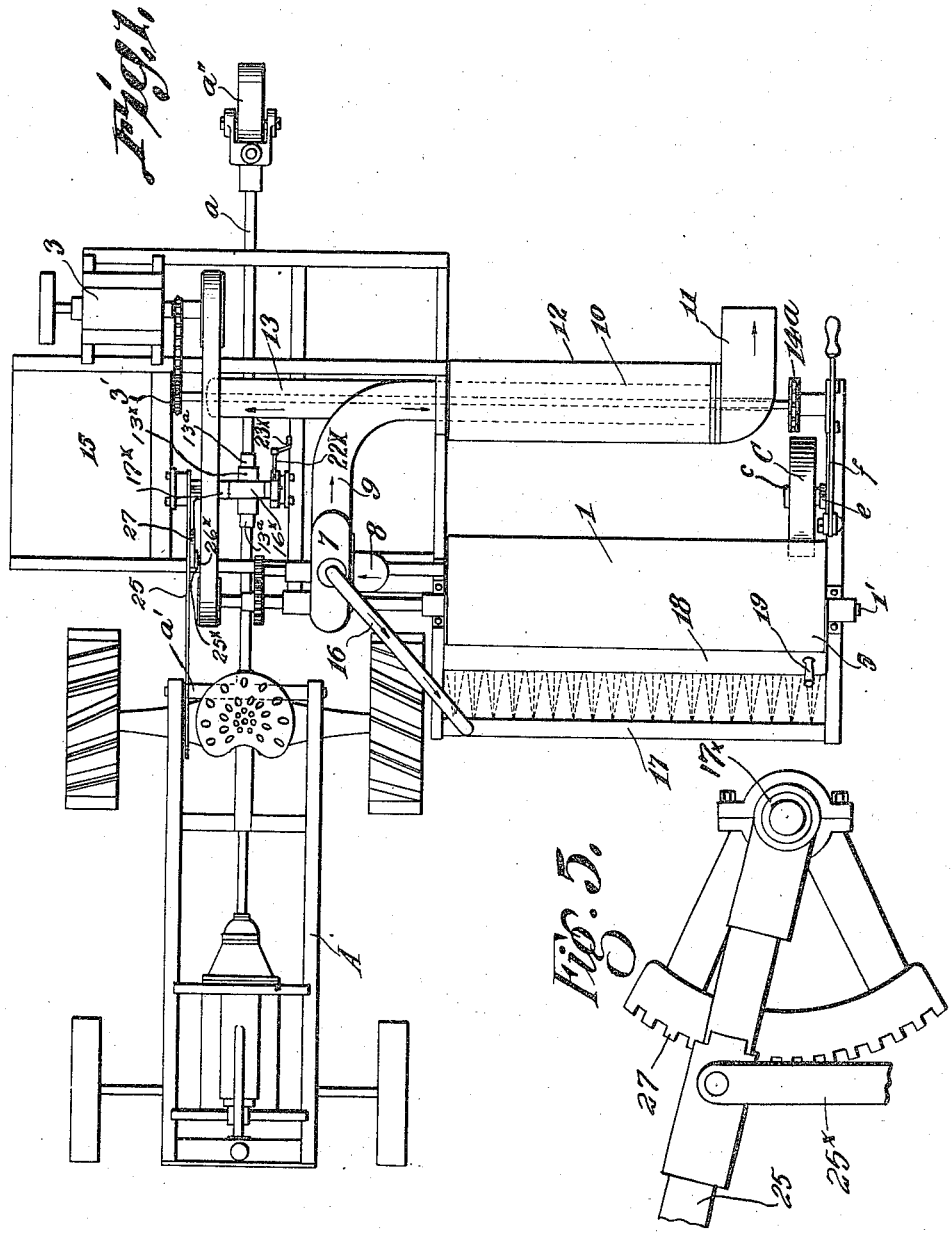
CHARLES OWENS
INVENTOR.
BY
ATTORNEY.

May 8, 1923.
C. OWENS
GRAIN HARVESTER
Filed March 26, 1921 2 Sheets-Sheet 2
1,454,071
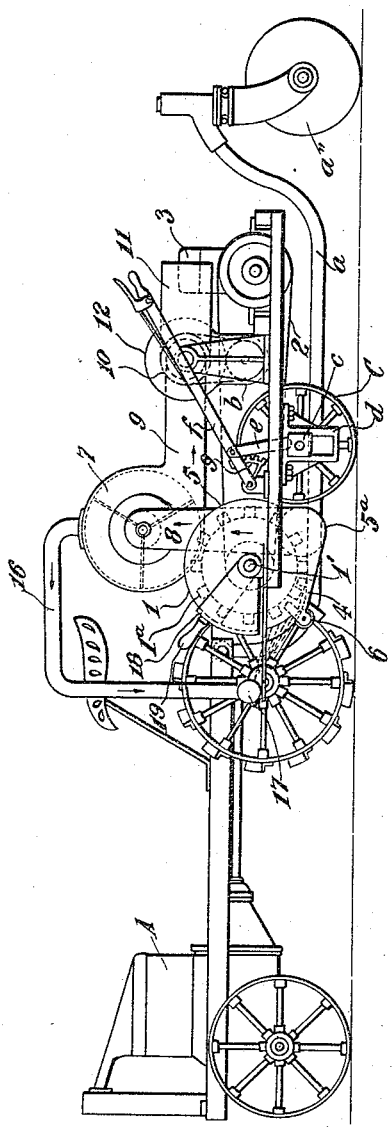
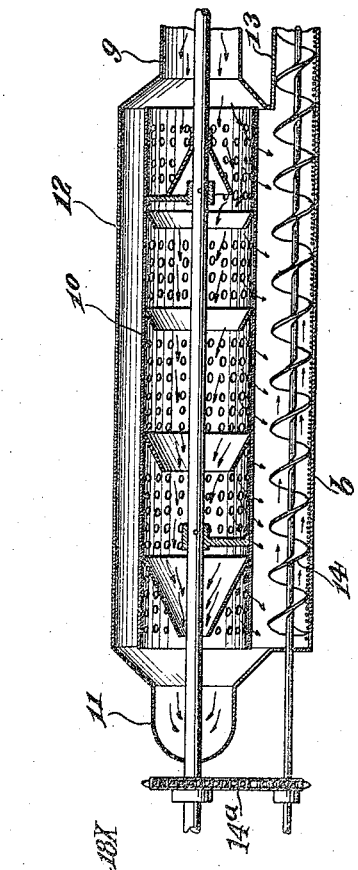
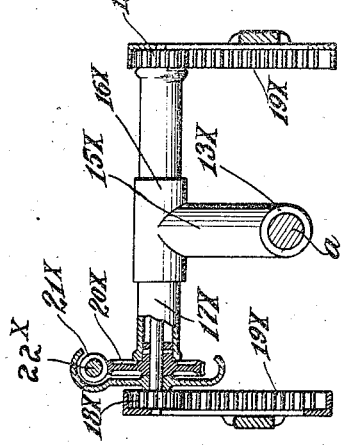
CHARLES OWENS
INVENTOR.
BY
ATTORNEY.

Patented May 8, 1923.

1,454,071

UNITED STATES PATENT OFFICE.

CHARLES OWENS, OF CHATTANOOGA, TENNESSEE.

GRAIN HARVESTER.

Application filed March 26, 1921. Serial No. 455,801.

*To all whom it may concern:*

Be it known that I, CHARLES OWENS, a citizen of the United States, and resident of Chattanooga, in the county of Hamilton and State of Tennessee, have invented certain new and useful Improvements in Grain Harvesters, of which the following is a specification.

The invention concerns a grain and seed harvester of the type in which the threshing of the grain is done by the harvesting machine directly from the standing crop.

One object of the invention is to simplify the construction by avoiding the use of mechanical carriers, elevators and the like, and instead to utilize air pressure for separating the grains from the chaff and for conveying the grain and the chaff to their respective points of discharge.

The invention is shown in the accompanying drawings in which—

Figure 1 is a plan view of the invention combined with a tractor and hitched as a trailing implement thereto.

Fig. 2 is a side elevation of Fig. 1.

Fig. 3 is a detail view of a supporting connection between the caster bar and the frame of the trailing implement.

Fig. 4 is a detail view.

Fig. 5 is a detail view of the usual means for tilting the binder frame around the axis of its support.

In these drawings 1 is a threshing machine cylinder mounted upon a shaft 1' which is driven by a belt 2 from a motor 3 mounted upon the rear part of the frame of the trailing implement. This trailing implement is connected with a trailing caster bar *a* which at its front end is hitched to the rear end of a tractor, indicated generally at A. This hitch may assume different forms but in the particular construction shown it consists of a cross bar *a'* mounted between sides of the tractor and to which the trailing caster bar *a* is attached, the front end of this caster bar being turned upwardly, as indicated in Fig. 2. This hitch will allow the caster bar to move freely up and down in a vertical plane, the rear end of the caster bar being supported by a caster wheel *a''*.

A connection between the frame of the trailing implement and the caster bar is provided, indicated generally at B, which will permit certain flexibility between the frame of the trailing implement and the caster bar to accommodate the conformation of the ground over which the implement is drawn. This connection will allow the implement to tip laterally, and the whole frame of the implement may rise and fall under the action of the caster wheel rolling upon the ground, and certain connections are provided by which the frame of the implement may be adjusted vertically to assume different distances from the ground as the height of the standing grain may require. This suspension or connecting device will be more fully described hereinafter.

The threshing cylinder is composed of projecting members 1ª and these cooperate with a fixed grid 4 to thresh the grain from the standing stalks. A roller 6 is provided at the front end of the grid and over this roller the stalks of the grain are bent as the machine progresses forwardly and this action is due also to the effect of air blasts issuing from a pipe 17 extending in front of the threshing cylinder and directing the air blasts rearwardly and downwardly, so that the heads of the standing grain will be forced into the casing 5 which surrounds the threshing cylinder, so that these heads will be acted on by the projections 1ª and the grain will be severed from the stalks, the said projections 1ª, as before stated, cooperating with the grid 4 for this purpose. The casing 5 is provided with a grain pocket at 5ª and from this a pipe 8 extends upwardly to the casing 7 of a suction fan. The pipe 8 discharges into the fan casing axially and laterally thereto, and the action of the fan is to cause a separation between the threshed grain and the chaff, and these separated elements are then discharged through a pipe line 9 leading from the fan casing 7 to a rotary sieve 10. This sieve is designed to separate the grain or seed from the chaff. The chaff is finally discharged through a pipe 11. The rotary sieve is contained within a steel housing 12 and this housing is provided with a grain pocket at *b*. This pocket extends under the sieve and has a discharge end or chute 13 for the delivery of the grain onto a platform 15, where the grain may be sacked as it is discharged from the chute 13.

The grain is delivered through the pocket *b* by a worm conveyor, indicated at 14.

The air supply to the pipe 17 is furnished by a pipe 16 extending from the top of the fan casing 7. The pipe 17 has openings at regular intervals in such relation to the heads of the grain and the exposed portion of the cylinder 1 and grid 4 as to direct the heads by the pressure of the air into the casing of the threshing cylinder as before stated.

This casing is provided with an adjustable portion 18 having a handle 19, so that the operator may expose more or less of the threshing cylinder, and to insure a ready entrance of the heads of the grain into the casing of the cylinder.

A grain wheel is indicated at C, this being mounted in a bearing $c$ vertically adjustable in a bracket $d$ depending from one of the frame bars of the apparatus, and this bearing may be adjusted vertically by a link $e$ connected thereto, and to a lever $f$ which is within convenient reach of an attendant, so that the height of the frame from the ground may be changed to accord with the height of the standing grain.

A segment is provided at $g$ which cooperates with a pawl in the ordinary manner for locking the adjusting parts in the desired positions. The connection between the frame of the implement and the trailing caster bar comprises a sleeve $13^x$ mounted on the caster bar between collars fixed thereon so that the sleeve may turn on the caster bar to allow the platform or frame of the implement to tip laterally to accommodate itself to uneven ground. This pivotal bearing or sleeve is adjustably connected with the platform organization to regulate the position of the threshing cylinder and the air blast appliance in relation to the ground to accord with the heights of the standing grain. For this purpose the sleeve or pivotal bearing $13^x$ has an upwardly extending standard portion $15^x$ with a transversely extending sleeve or bearing $16^x$ at its upper end in which is mounted the ordinary bull wheel shaft $17^x$, carrying, as usual, pinions $18^x$ at its ends engaging with the usual racks $19^x$ connected with the platform organization of the implement. This shaft $17^x$ is in the position ordinarily occupied by the shaft of the bull wheel, and in fact this shaft is the bull wheel shaft itself, minus the gear wheel commonly employed thereon for driving certain mechanism of a binder, and the mounting of this shaft by means of the racks is in accordance with the usual practice. This shaft $17^x$, therefore, instead of being sustained at a distance above the ground by a bull wheel, as in ordinary practice, is sustained by the caster wheel and trailing caster bar, which supports the sleeve $13^x$ and standard $15^x$.

The shaft $17^x$ has a worm wheel $20^x$ turned by a worm $21^x$ from a shaft $22^x$ and suitable handle by which the operator can adjust the height of the platform at this end in relation to the ground by raising or lowering the racks.

This adjusting mechanism, in connection with the adjustment above described for the grain wheel, will enable the frame of the implement to be set at the desired heights from the ground to accord with the heights of the standing crop. The implement is self-contained in that the power for performing the several operations is derived from the motor mounted on the implement itself. It will be noted that all of the parts are driven rotatively and no reciprocating members are employed. The threshing of the grain takes place directly from the standing stalks. The pressure of air is employed for carrying out the several operations and as conveying means, thus dispensing with the canvas carriers and elevators usually employed. The screw conveyor 14 is driven from the motor 3 through connections indicated at 3' and the rotary sieve is driven from the shaft of the screw conveyor through suitable gearing, indicated generally at $14^a$.

The threshing of the grain takes place while the stalk is standing, and not as in previous practice, where the head is first separated from the stalk and thereafter the grain is separated from the head. Consequently, in my apparatus, after the standing grain comes in contact with the threshing cylinder, the operations concern chiefly the separation of the chaff from the grain. The cylinder and grid may be of the standard character employed in a regular threshing machine.

Usual means are provided for tilting the frame around the axis which takes the place of the bull wheel shaft. This means includes the hand lever 25 turnable about the axis of the shaft $17^x$ and connected by a link $25^x$ with a part of the frame at $26^x$. The lever works over a fixed segment 27 as usual and by the movement of this lever up and down the auxiliary frame can be tipped forward and backward and thus raise and lower the threshing cylinder and concave relative to the varying height of the grain.

I claim:

1. In combination, a main frame having a caster wheel at its rear end, an auxiliary frame mounted upon the main frame and extending laterally thereto, a threshing cylinder and concave mounted on the auxiliary frame at its forward end, the cylinder and concave having an absolutely free and unobstructed grain entrance to their threshing-field of action, the auxiliary frame being supported at its outer end by a grain wheel, means for raising and lowering the auxiliary frame vertically in its relation to the main frame and means for tilting the auxiliary frame on the axis of its vertical raising and lowering means, the said tilting means being under the control of the operator as the machine is traveling, so as to adjust the position of the threshing cylinder and concave to the varying height of grain.

2. In combination, a main frame having a caster wheel at its rearward end, an auxiliary frame mounted upon the main frame and extending laterally thereto, a threshing cylinder and concave mounted on the auxiliary frame, the cylinder and concave having a free and unobstructed grain entrance to their field of action, means for feeding the grain within the field of action, the said feeding means being the suction provided by the cylinder itself in conjunction with the suction derived from a suction fan, means for raising and lowering the auxiliary frame vertically in its relation to the main frame, a grain wheel at the outer end of the auxiliary frame, means for tilting the auxiliary frame on its tilting axis, said tilting means being under the control of the operator while the machine is in operation.

In testimony whereof, I affix my signature.

CHARLES OWENS.